United States Patent [19]

Breland

[11] Patent Number: 5,277,248
[45] Date of Patent: Jan. 11, 1994

[54] BALL VALVE TYPE INJECTOR AND CATCHER APPARATUS WITH ADJUSTABLE FLOW CONTROL FOR CATCHING AND RETRIEVING PARAFFIN CUTTING BALLS

[75] Inventor: Clarence W. Breland, Trout, La.

[73] Assignee: B and E Manufacturing & Supply Co., Trout, La.

[21] Appl. No.: 885,357

[22] Filed: May 19, 1992

[51] Int. Cl.[5] .................... E21B 33/068; B08B 9/04
[52] U.S. Cl. ................... 166/70; 15/104.062; 137/268
[58] Field of Search ............ 166/70, 95, 97; 15/104.062; 137/268

[56] References Cited

U.S. PATENT DOCUMENTS

| | | | |
|---|---|---|---|
| 2,876,842 | 3/1959 | McSpadden | 166/70 X |
| 3,035,640 | 5/1962 | Gibson et al. | 166/70 |
| 3,177,513 | 4/1965 | Ellett | 15/104.062 |
| 3,220,432 | 11/1965 | Allen | 137/268 |
| 3,283,354 | 11/1966 | Simmons | 15/104.062 |
| 4,016,621 | 4/1977 | Slegers et al. | 15/104.062 |
| 4,073,303 | 2/1978 | Foley, Jr. | 15/104.062 |
| 4,317,486 | 3/1982 | Harris | 166/70 X |
| 4,420,040 | 12/1983 | Arbasak et al. | 166/70 |
| 4,854,383 | 8/1989 | Arnold et al. | 166/70 |

FOREIGN PATENT DOCUMENTS 551904  1/1958  Canada ................... 15/104.062

*Primary Examiner*—Hoang C. Dang
*Attorney, Agent, or Firm*—Sughrue, Mion, Zinn Macpeak & Seas

[57] ABSTRACT

A ball valve type injector and catcher apparatus is formed of a valve body with a generally spherical internal cavity and a diametrical bore defining an axial flow passage therethrough. A generally spherical valve member in the valve body rotates about an axis perpendicular to the axis of the flow passage. A diametrical bore of the valve member has an axis perpendicular to the pivot axis thereof. A ball entry and removal passage is perpendicular to the diametrical bore of the rotatable spherical valve member. A doll cap seals off the ball entry and removal passage. A retainer carried within the diametrical bore of the rotatable valve member captures a paraffin cutting ball. A bypass fluid passage within the valve body opens at opposite ends. A knock-out rod projectable into the interior of the diametrical bore of the rotatable valve member mechanically drives the paraffin cutting ball through the ball entry and removal passage after removal of the doll cap. A drain passage to the valve cavity permits draining of accumulated liquid escaping through seals to the valve body cavity. An adjustable needle valve permits the bypass passage to be completely closed off.

5 Claims, 2 Drawing Sheets

BALL VALVE TYPE INJECTOR AND CATCHER APPARATUS WITH ADJUSTABLE FLOW CONTROL FOR CATCHING AND RETRIEVING PARAFFIN CUTTING BALLS

FIELD OF THE INVENTION

This invention relates to the removal of a deposit from the inside of a pipeline, and more particularly to the removal of deposits such as wax, scale and the like from oil well tubing.

BACKGROUND OF THE INVENTION

Typically, oil well tubing has a build-up of paraffin or a like wax on the interior surface. Such buildup can interfere significantly in the flow of oil and other fluids within the tubing. It has been found useful to cause a rubber ball having an outer diameter slightly less than the internal diameter of the tubing to be driven by the oil or other fluid, such as water, through the pipelines, particularly between the well head and tank battery. The ball functions to in turn wipe the accumulated deposit of paraffin from the interior surface of the well tubing, pipeline or similar oil conduits.

U.S. Pat. No. 2,876,842 to Thomas W. McSpadden issued Mar. 10, 1959, and entitled "Method and Apparatus for Cleaning Wells," teaches the introduction of an oil soluble plug formed from a microcrystalline wax, such as a petroleum ceresin wax, of elongated cylindrical form sized slightly smaller than the diameter of an oil well tube at the well head, wiping an accumulated deposit of paraffin wax, scale or the like from the inside surface of the tubing.

The plug is introduced into the top of the well head tubing by removal of a bull plug, which is unscrewed from a cross attached to the well head and projecting upwardly of the same. The bull plug includes a perforated sleeve axially aligned with the tubing and having an internal diameter size thereto, which initially receives the plug.

U.S. Pat. Nos. 4,317,486 issued Mar. 2, 1982, to Monty E. Harris and entitled "Cementing Head Apparatus and Method of Operation," and 4,854,383 issued Aug. 8, 1989, to Ronald D. Arnold et al. and entitled "Manifold Arrangement for Use With a Top Drive Power Unit" teach the use of rotary ball valves having a diametrical cylindrical passage or bore through the center of the rotatable ball valve which is selectively aligned with the axis of the oil well tubing within which the valve structure is mounted for permitting the passage of a plug capable of being pushed by hydraulic pressure through the casing to clear the tubing, or rotated 90° to the axis of the tubing to close off the fluid passage through the tubing and to prevent movement of the plug, which plug may be maintained within the portion of the tubing above the rotatable ball valve.

U.S. Pat. No. 3,035,640 issued May 22, 1962, to W. C. Gibson et al. and entitled "Kelly Cock" is directed to a cylindrical, rotary valve member within an enlarged casing portion of an oil pipeline in a oil well drilling apparatus for facilitating the insertion of a ball sized slightly smaller than the well tubing string, to seat the ball in the bore of a cement follower plug following the flow of cement downwardly into the string to shut off an opening therein and allowing pump pressure to move the cement follower plug down the casing until it seats into a float shoe. The body includes an axial flow chamber with an enlarged cylindrical portion carrying a transverse cylindrical bore whose axis intersects the axis of the through bore. Rotatably and sealably mounted within the transverse crossbar is a cylindrical plug having a diametrical flow passage therethrough at right angles through its axis having substantially the same diameter as the diameter of the through bore. Further, at one end of the plug, there is a reduced diameter axial bore which extends from that end to the diametrical flow passage which receives a threaded plug insert which is removable to permit the insertion of a ball which is permitted to fall downwardly within the axial bore of the enlarged casing and the axial bore of the pipeline string, upon 90° rotation of the rotatable cylindrical plug from a position where it closes off the flow passage provided by the bore and the through bore of the enlarged casing to one where the diametric cylindrical flow passage within the rotatable cylindrical plug is aligned with that casing through bore.

U.S. Pat. No. 4,420,040 issued Dec. 13, 1983, to David P. Arbasak et al. and entitled "Ball Catcher" is directed to a ball catcher having a radially enlarged housing coupled to a casing of an oil well and functioning to catch a ball. A stinger, taking the form of an elongated annular cylindrical member whose sides are perforated, extends axially downwardly at the top of the radially enlarged casing, and stops the flow of balls moving upwardly with the liquid during well flow back operation after fracturing of the well formation. The balls are captured between the stinger and inwardly directed baffles fixed to the inner periphery of the radially enlarged casing at some distance below the lower end of the stinger.

While the apparatus of the various patents described above illustrate the use of balls or plugs or like elements which are fluid driven through a well tubing string, or similar piping, and elements for controlling the movement of such balls or plugs through the interior bore of the well tubing string, and for the introduction and catching of such balls, there is no simplified unitary valve structure capable of introduction of a paraffin cutting ball into a well tubing system, or capturing of such ball after travel a predetermined distance through the tubing for removing of the ball from the flow passage system, while ensuring that the paraffin removal ball does not harm the elements making up the string of casing or tubing and does not induce large hydraulic pressures within the elements of that apparatus, which permits the ball catcher to function as a valve for closing off the axial bore within the valve casing supporting the catcher, which readily permits bypass of the oil or other hydraulic fluid flowing through the interior of the tubing string, which permits the bypass passage itself to be closed off when needed to ensure the movement of a ball placed into the string through the string and which provides a ready arrangement for draining the valve cavity supporting the movable valve member having the dual function of closing off the string and the introduction of the paraffin removal ball, or removing of the same after catching of the ball during its movement through the tubing string from its point of insertion at some distance from the catcher.

DESCRIPTION OF PREFERRED EMBODIMENT

Figure 1:
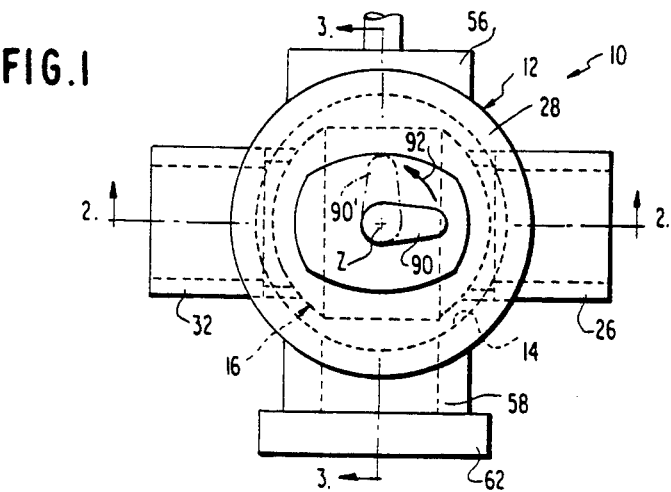
FIG. 1 is a top plan view of a ball valve type ball injector and catcher with adjustable flow control forming a preferred embodiment of the invention.

Referring more particularly to the drawings, the ball type injector and catcher apparatus indicated generally at 10 is a modified, rotary ball valve consisting principally of a generally spherical valve body 12 forming integrally a hollow valve cavity 14 within which is rotatably supported a rotatable spherical valve member 16. Either or both the valve body and member may be formed of metal. The rotatable valve member 16 is mounted for rotation about a vertical axis Z via a stub axil or shaft 18, sized to and fitted within a vertical, radial bore 20 within the valve body 12. The spherical valve member 16 is fixed to a reduced diameter portion 20a of the stub shaft 18, such that rotation of the stub shaft 18 by means of a handle, tool or the like (lever 90), FIG. 3, causes a like rotation of the spherical valve member 16 about the common Z axis. A diametrical bore 22 is formed within the spherical valve member 16 through the center of the same, having a axis X at right angles to the Z pivot axis of the spherical valve member.

The generally spherical valve body 12 is provided with a diametrical bore 24, at right angles to the small diameter bore 20. The shaft 18 is mounted within the bore 20. A cylindrical valve body member 26, of relatively short axial length, may be integrally formed with a spherical valve body member 28, or separately formed and welded thereto as by weld W. The valve body cylindrical member 26 is provided with an axial bore 30 and is sized to and may be axially aligned with the bore 22 of the rotatable spherical valve member 16. To the left, FIG. 2, a similar sized and shaped hollow cylindrical valve body member 32 projects radially outwardly of the generally spherical valve body member 28, may be integrally formed therewith, or separately formed and welded thereto as at W. The cylindrical valve body member 32 is provided with an axial bore 34 aligned with bore 30 of valve body member 26. In the valve open position, FIG. 2, for the rotatable spherical valve member 16, the axes X of the two cylindrical valve body members 26, 32 and the axis of bore 22 of the rotatable valve member are aligned. The cylindrical valve body member 32 is otherwise fitted into the portion of bore 24 of the generally spherical valve body 12 on the left side of that member. The axially inboard ends of valve body members 26 and 32 carry annular seals as at 36, 38, respectively, which act to seal off the portions of valve cavity 14 from the bores 34, 22 and 30 of the apparatus. Oil flow is shown to be from left to right, FIG. 2, as indicated by arrow A at the inlet end of an oil flow passage as defined by bore 34, which defines inlet port 40 for the valve 10. Arrow B indicates the exit flow of that same oil at the downstream end of valve body cylindrical member 26, with the oil exiting at outlet port 42 of the apparatus 10. As may be seen in FIG. 2, a rubber paraffin cutting ball 48 is lodged interiorly of bore 22 of the rotatable generally spherical valve member 16 of the ball type injector and catcher 10 as a result of being driven into that position through bore 34 of valve body 12, cylindrical member 32. The rubber ball 48 is in abutment with the upstream face 44a of a circular metal retainer of disk form at 44. The disk retainer 44 is fixedly attached to the spherical rotatable valve member 16 as by being welded thereto at W'. A central aperture or opening 46 is provided within the disk retainer 44 to permit the continued flow of oil or other liquid through the bore 22 of the spherical valve member 16, unless aperture 46 is physically sealed off by the rubber ball 48, whose diameter is on the order of but slightly less than the diameter of the oil well tubing (not shown) to which the apparatus 10 is coupled at the radially outboard ends of cylindrical members 26, 32.

An O-ring seal or the like, as at 50, is carried within annular groove 52 of radial bore 20 of valve body generally spherical member 28 for sealing off cavity 14 from the exterior valve body 12 with the O-ring pressing against the outer periphery of rotatable shaft 18 to accomplish that seal. As seen in FIG. 1, in plan view, the ball valve body 12 is cross-shaped, having four radial projections. The one to the left in FIG. 1 is the valve body cylindrical member 32, that to the right is the mirror image valve body cylindrical member 26. Further, as seen in FIG. 1, and more particularly in FIG. 3, the generally spherical valve body member 28 carries a second through bore at 54, which is at right angles to the first through bore 24. The through bore 54 opens to the valve cavity or chamber 14 and there is integrally formed, or separately formed and welded thereto by weld W, a cylindrical valve body end plug 56 for closing off the bore 54 to the right, FIG. 3. Member 56 is of short axial length. To the opposite side of the valve body cavity 14, bore 54 receives the projecting end of a cylindrical hollow tubular valve body member 58, which is of greater length than plug 56, and which has a axial bore 60 on the order of the diametrical through bore 22 of the rotatable valve member 16. When the rotatable valve member 16 is rotated 90° from the position shown in FIG. 2 to a valve closed condition for the ball valve 10, as per FIG. 3, the axial bore 22 has its axis aligned with axis Y of the bore 60 such that the rubber paraffin cutting ball 48 can be physically removed from the ball valve type ball injector and catcher apparatus 10 by a mechanical means in the form of a knockout rod 80, pushing the ball 48 to the left, FIG. 3, through bore 60 of valve body cylindrical member 58.

Normally, the end 60a of bore 60 is closed off by a doll cap or end cap 62 of cylindrical form. End cap 62 is shown generally cup shaped, having internal threads 64 which mesh with external threads 66 on the axially outboard end 58a of the valve body member 58. In order to seal off the end cap 62, the outer annular edge 58b of the cylindrical valve body member 58 may be provided with an annular groove 68 within which resides an O-ring seal 70 compressed therein and pressing against the face 62a of end cap 62. Alternatively, the cup shaped end cap may be friction fitted to the end 58a of the tubular member 58. As may be appreciated, when the rotatable valve member 16 is rotated from the position shown in FIG. 2 90° to the right or left, about the vertical pivot axis Z, a solid exterior face of the generally spherical valve member 16 presses against the annular seals 36, 38 at the outlet and inlet ports 42, 40, respectively, to prevent oil or other liquid flow through the apparatus 10.

Figure 2:
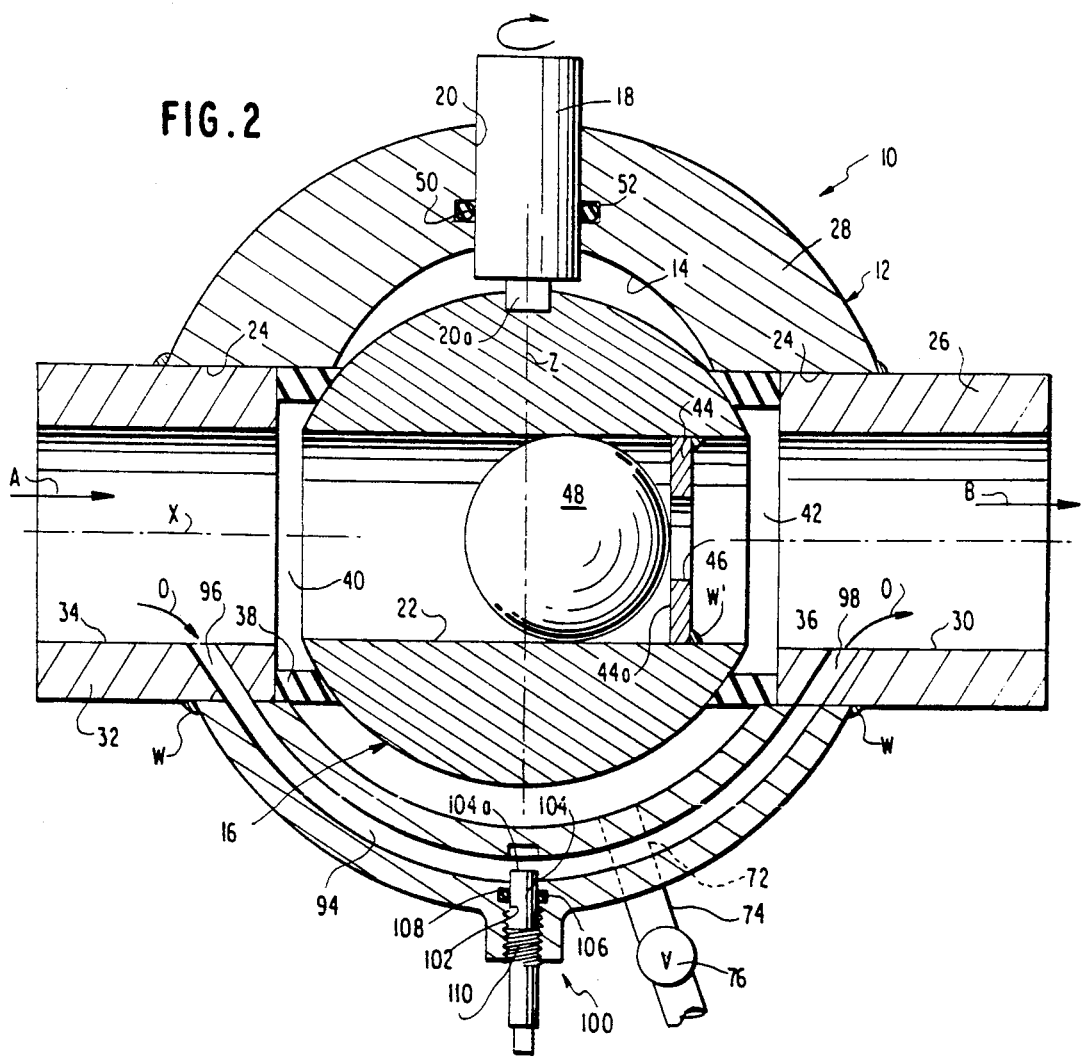
FIG. 2 is a vertical sectional view of the apparatus of FIG. 1 taken about line 2—2.
Figure 3:
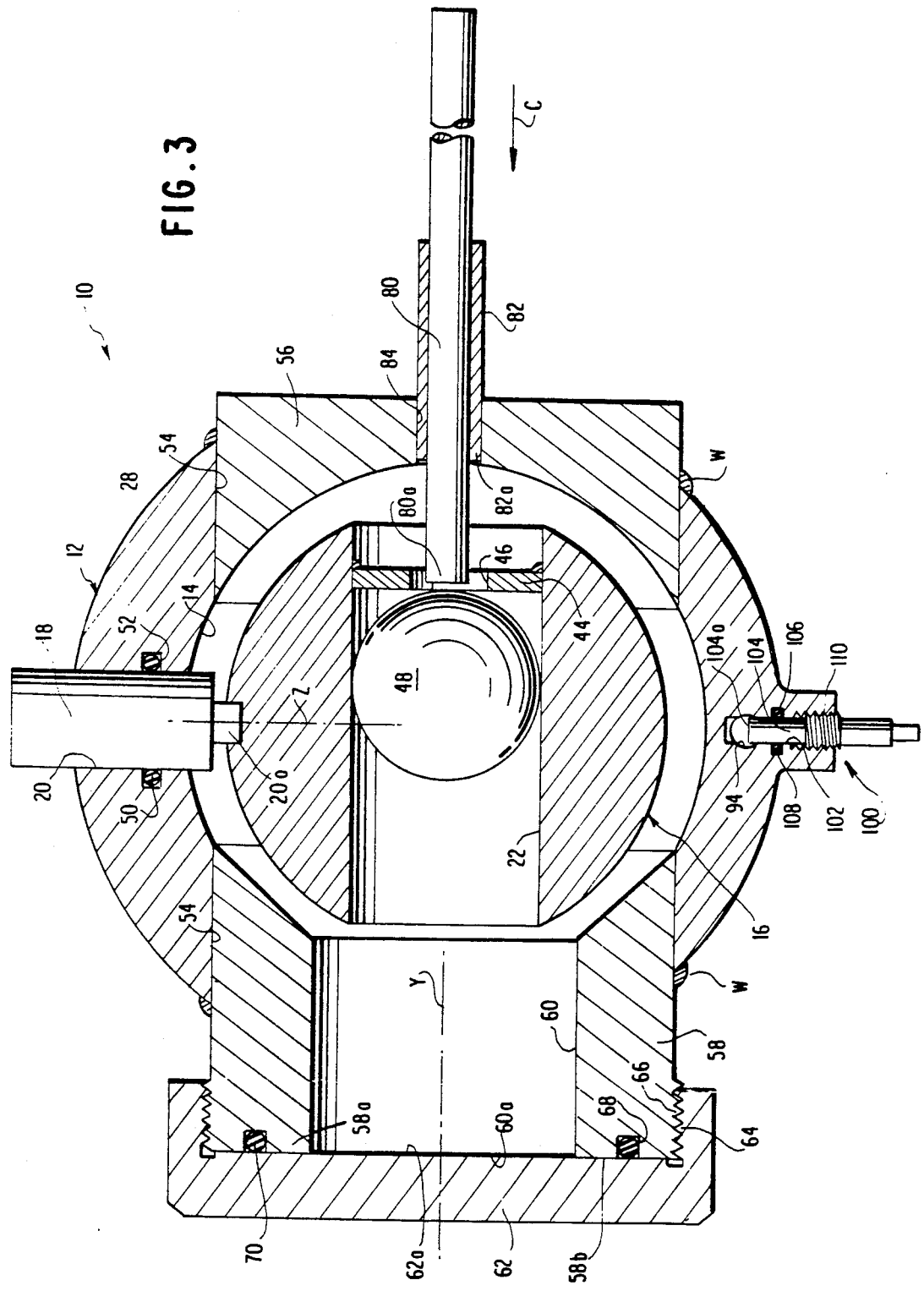
FIG. 3 is a vertical sectional view of the apparatus of FIG. 1 taken about line 3—3.

Any accumulated liquid within that valve cavity 14 can be drained via a radial drain hole or passage 72, FIG. 2, which extends from the valve body cavity 14 to the exterior of the valve body 12 and which passage 72 is continued by a pipe or casing 74 bearing a drain valve indicated schematically at 76. That drain valve for drain tube 74 may be open after the ball valve type ball injector and catcher apparatus is in valve closed condition, as shown in FIG. 3, and prior to ejection of the rubber ball 48 from bore 22 of the rotatable valve member 16, after being captured therein. Ejection is effected by removing the end cap 62 and physically driving the ball 48 from bore 22 of the rotatable valve member 16 and its coaxially-aligned bore 60 of the valve body cylindrical member 58 via knockout rod 80, FIG. 3. Rod 80 is supported within a cylindrical tube 82 concentrically surrounding the rod, slidably supporting the same and having an end portion 82a fixedly positioned with an axial hole 84 within end plug 56. Such rod 80 may be manually manipulated and simply driven to the right, as per arrow C, FIG. 3, such that the inboard end 80a impacts against the periphery rubber ball 48 to drive it to the left and out of the apparatus 10 (with the end cap 62 removed). Subsequent to a knockout of the ball 48, the rotatable spherical valve member 16 is rotated 90°, preferably in the opposite direction to the initial rotation, after capture of ball 48, from the position shown in FIG. 2 to that in FIG. 3. Specifically from plan view FIG. 1, with the inlet port 40 to the left and the outlet port 42 to the right, the rotatable valve member 16 would be rotated via a handle or lever 90 counterclockwise, as indicated by arrow 92 to a position such that the downstream disk retainer 44 faces the knockout rod 80, permitting the ball 48 captured by the apparatus 10 rotatable valve member 16 to face the open end of cylindrical valve body 58, and permitting removal of the paraffin cutting ball 48 after removal of the doll cap or end cap 62. Thus, after the paraffin cutting ball 48 is removed from the apparatus 10, and after the doll cap 62 has been threadably and sealably mounted, as shown in the sectional view FIG. 3, the manually operated lever 90 may be rotated clockwise in opposition to the arrow 92 back to the position shown in solid line in FIG. 1, from the dotted line position 90', and a change from valve closed to valve open position, whereby flow of the oil from the formation, or other liquid may pass through the apparatus 10 via inlet port 40 and outlet port 42 and, in this case, passing principally through the open aperture 46 within the retainer 44, FIG. 2.

The apparatus 10 advantageously employs a liquid bypass passage of circular cross section, as at 94, having an inlet opening or port 96 at the upstream edge, opening to bore 34 of cylindrical valve body member 32, while the downstream end of the passage 94 opens at a discharge port 98 at bore 30 of valve body cylindrical member 26. The inlet port 96 of the bypass passage 94 is upstream of the inlet port 40 of the rotatable spherical valve member 16 for the apparatus 10, while the outlet port 98 of the bypass passage 94 is downstream of the outlet port 42 thereof. As such, irrespective of whether the rotatable valve member 16 is in closed or open position, some flow can bypass the normal flow route through the through bore 22 of the movable valve member 16 bearing the aperture disk retainer 44 and specifically through the central aperture 46 thereof.

Further, the apparatus 10 mounts within the hollow, generally spherical valve body member 28, a variably adjustable bypass needle valve indicated generally at 100 for selectively closing off bypass passage 94 intermediate of its inlet port 96 and outlet port 98. The bypass needle valve 100 is formed by a radial bore 102 within the generally spherical valve body member 28, which extends from the outer periphery of valve body 12, to the bypass passage 94 and intersects the same. The bore 102 slidably and sealably supports a cylindrical valve stem 104 of solid rod form whose inner end 104a projects interiorly of the bypass passage 94 and, with the rod 104 being sized in excess of the diameter of the bypass passage 94, acts when end face 104a passes completely through the radial bore 102 to seal off completely the bypass passage 94. A radial groove 106 within the bore 102 carries an O-ring seal 108 which is compressed therein and presses against the outer periphery of the valve stem 104 to prevent fluid leakage through bore 102 beyond the O-ring seal and to ensure, irrespective of whether that valve is open or closed, that liquid entering the bypass passage 94 can escape only through its outlet port 98. The bypass needle valve preferably carries a thread at 110 on its outer periphery, which match that of the tapped hole or bore 102 so that, by rotation of the needle valve stem 104 about its axis, the end face 104a of the needle valve stem 104 may project more or less into the interior of the bypass passage 94. In that respect, very accurate, easily adjusted metered amounts of liquid, such as oil as at O, FIG. 2, may enter the bypass passage and exit therefrom, as indicated by such arrows. From the two sectional views, FIGS. 2 and 3, taken in conjunction with the top plan view, FIG. 1, it is apparent that the paraffin cutting ball 48 enters the injector and catcher apparatus 10 from the inlet, and upstream side of the apparatus to the left, FIG. 2, where it is caught by the disk retainer 44 and held therein by pressure acting on the upstream face of the ball 48 as being lodged within bore 22, FIG. 2. The ball valve type ball injector and catcher 10, by rotation of the rotatable valve member 16, 90°, closes off the flow passage defined by bores 30 and 34 of apparatus 10, and places the bore 22 of the rotatable valve member 16 coaxial with bore 60 of the valve body cylindrical member 58. After removal of cap 64, the captured rubber ball is ejected from the apparatus 10 and the rotatable valve member can then be rotated in the opposite direction 90° to place the apparatus in the valve open condition shown in FIG. 2 (absent the presence of paraffin cutting ball 48).

It should be appreciated that all outlets are covered with positive seal caps or plugs to ensure against any chance of leaks which might pollute the environment. Further, appropriate O-ring seals or the like are provided to prevent a loss of liquid from the interior of the apparatus 10 likely to pollute the environment by seepage between relatively movable members such as that at 50 of valve actuator shaft, coupled at its inboard end to the movable valve member 16 and at its outboard end to the manual operating lever 90, FIG. 1, and a similar O-ring seal at 108 for the bypass needle valve 100. It should be appreciated that the valve type ball injector and catcher apparatus 10 is not only employed for catching and retrieving a paraffin cutting ball after its passage through a string of tubing and removing the accumulated deposits of paraffin on the inside walls thereof, but the apparatus 10 is useful in the injection of the ball into a line where the apparatus 10 is at the upstream end thereof.

Briefly, in injecting a rubber ball 48 into a tubing string, the rotatable spherical valve member 16 is rotated to the closed position, the drain valve 76 is shifted from closed state to open state for the drain pipe 74 such that any accumulated liquid within the closed off valve cavity 14 may drain from the valve body 12. The doll cap 62 is removed; if in the illustrated form as shown being threaded to the outer periphery of the valve body cylindrical member 58, it must be unthreaded. Alternatively, if it is merely friction fitted to cylindrical member 58, it may be pulled off or, alternatively, pushed off using the knockout rod 80.

A ball 48 is physically placed in the bore 22 of the rotatable spherical valve member 16, and the knockout rod 80 is at least withdrawn to the left, FIG. 3, so that the valve member 16 can be rotated about the vertical axis Z by manual operation of lever 90, 90° to the position shown in FIG. 3 and occupying a position 180° from that as shown in FIG. 2, so that the disk retainer 44 is upstream and the rubber ball 48 is facing outlet 42. This would require a rotation clockwise 90° from the position of the lever 90 as shown in a solid line, FIG. 1. The valve type ball apparatus 10 is open and the incoming liquid, such as oil (or other liquid) as per arrow A, FIG. 2, drives the paraffin cutting ball through the outlet port 42 in a direction of arrow B.

If necessary, the needle valve 100 should be fully closed or closed to the extent necessary to ensure that sufficient liquid passes through bore 22 of the rotatable valve member 16 to discharge the ball from its captured position against the now upstream retainer 44. After the ball is injected, the needle valve should be fully opened so that a significant amount of the oil flow passes through bypass passage 94.

For a ball retrieving operation, the rotatable valve member 16 must be rotated to the position shown in FIG. 3 such that the retainer 44 is on the downstream side of the apparatus 10 and proximate to the outlet port 42. In this position, a rubber ball 48 employed for removing paraffin from the interior wall surface of the tubing string will enter and lodge against the retainer 44. The presence of the rubber ball 48 tends to close off the aperture 46 within the retainer and most, if not all, of the flow of oil or other liquid as per arrow A, FIG. 2, will flow through the bypass passage 94. This keeps any oil spillage from occurring since there is no pressure buildup therein. The volume of the rate of flow of the liquid in the bypass passage 94 is controlled by axial position of the needle valve stem 104 with the rotatable valve member 16 rotated 90° to the position shown in FIG. 3, the inlet and outlet ports 40, 42 are sealed off by the periphery of the spherical rotatable valve member 16 acting on annular seals 38, 36, respectively. The only flow permitted in the apparatus 10 is through the bypass passage 94, and that flow is controlled rate-wise by needle valve 100.

Prior to removal of the doll cap 62, the trapped fluid behind the annular seals 36, 38 in the valve body cavity 14 is drained by opening of the drain valve 76. The paraffin cutting ball 48 is then removed by axial insertion of the knockout rod 80 as per arrow C, FIG. 3. If desired, and if the doll cap is frictionally mounted to valve body cylindrical member 58, it may be removed simultaneously with the ball via the knockout rod. Rotation of the spherical rotatable valve member 16 to the position shown in FIG. 2 or 180° to that position opens the ball valve type injector and catcher apparatus 10, permitting flow through axially aligned bores 34 and 30 of the valve body 12, and the diametrical bore 22 through the center of the spherical valve member 16. The doll cap may be replaced on the end 58a of the valve body cylindrical member 58.

It should be appreciated that, while the principal members of the apparatus 10 are shown as separate elements welded or otherwise affixed to each other and taking a cross configuration in plan view FIG. 1, the valve body may be other than spherical form with radial projections, and the rotatable valve member 16 may be other than spherical in configuration. The elements of the apparatus may be formed of metal or other material, as long as the elements are capable of withstanding the developed hydraulic pressures in the operation of the apparatus.

The foregoing disclosure and description of the invention is illustrative and explanatory only, and various changes in size, shape and materials, as well as in the details of the illustrated construction, may be made without departing from the spirit of the invention.

What is claimed is:

1. A ball valve type injector and catcher apparatus for catching and retrieving paraffin cutting balls comprising:

a valve body having a generally spherical internal cavity;

a diametrical bore through said valve body defining an axial flow passage and forming opposed, axially aligned inlet and outlet ports;

a generally spherical valve member sealably mounted in said valve body for rotation about an axis perpendicular to the axis of said flow passage through said valve body;

a diametrical bore through the center of said generally spherical valve member having an axis perpendicular to the pivot axis of said valve member and being sized to and axially alignable with the axis of said flow passage and with said inlet and outlet ports in a first, valve open position of said rotatable valve member, said rotatable valve member being rotatable 90° to cause said rotatable spherical valve member to close off said axially aligned inlet and outlet ports, said valve body further including a ball entry and removal passage perpendicular to said diametrical bore and sized to said diametrical bore of said valve member and selectively alignable therewith and extending through a side of the valve body perpendicular to the axis of said diametrical bore;

a removable doll cap sealably and removably mounted to said valve body for sealing off said ball entry and removal passage;

a retainer carried by said rotatable valve member within said diametrical bore thereof and at one end thereof for capturing a paraffin cutting ball when the rotatable valve member is positioned such that the end of said diametrical bore of said rotatable valve member remote from said retainer is proximate to and in axial alignment with the inlet port, and said retainer bearing an aperture to permit flow of liquid therethrough, absent the presence of said paraffin cutting ball;

a bypass fluid passage within said valve body, opening at one end to said axial flow passage defined by said diametrical bore of said valve body, upstream of said inlet port, and opening at an opposite end to said axial flow passage downstream of said outlet port; and means carried by said valve body for mechanically driving said paraffin cutting ball from said rotatable valve member diametrical bore through said ball entry and removal passage when said rotatable valve member is in valve closed position and said rotatable valve member diametric bore is aligned with said paraffin cutting ball entry and removal passage and open thereto, and wherein said apparatus further comprises a bypass valve means carried by said valve body for variably closing off the bypass passage to ensure flow of liquid through said apparatus during a paraffin cutting ball injection operation by entry of liquid through said inlet port, and acting against the periphery of the paraffin cutting ball to drive the same from the diametrical bore of the rotatable spherical valve member.

2. The apparatus as claimed in claim 1, further comprising annular seals mounted to one of said valve body and said rotatable valve member and sealing the valve body about the periphery of said inlet and outlet ports to minimize liquid leakage into the valve body cavity during operation of the apparatus, and means carried by said valve body for selectively draining any liquid leaking past said annular seals into said valve body cavity.

3. The apparatus as claimed in claim 1, wherein said removable doll cap is coupled to an end of said valve body and closes off said paraffin cutting ball and removal passage at a radially outboard end of the same, such that, prior to removing of said removable doll cap, said liquid leaking into said valve cavity may be drained therefrom prior to ejection of a paraffin cutting ball captured by said apparatus, or a paraffin cutting ball positioned within said rotatable valve member diametrical bore for injection through said apparatus.

4. The apparatus as claimed in claim 1, wherein said retainer comprises retainer plate including an aperture in the center thereof, aligned with the center of the paraffin cutting ball such that the presence of the paraffin cutting ball within the diametrical bore of the rotatable valve member acts to seal off the aperture and prevent flow of liquid through the valve member bore.

5. A ball valve type injector and catcher apparatus for catching and retrieving paraffin cutting balls comprising:

- a valve body having a generally spherical internal cavity;
- a diametrical bore through said valve body defining an axial flow passage and forming opposed, axially aligned inlet and outlet ports;
- a generally spherical valve member sealably mounted in said valve body for rotation about an axis perpendicular to the axis of said flow passage through said valve body;
- a diametrical bore through the center of said generally spherical valve member having an axis perpendicular to the pivot axis of said valve member and being sized to and axially alignable with the axis of said flow passage and with said inlet and outlet ports in a first, valve open position of said rotatable valve member, said rotatable valve member being rotatable 90° to cause said rotatable spherical valve member to close off said axially aligned inlet and outlet ports, said valve body further including a ball entry and removal passage perpendicular to said diametrical bore and sized to said diametrical bore of said valve member and selectively alignable therewith and extending through a side of the valve body perpendicular to the axis of said diametrical bore;
- a removable doll cap sealably and removably mounted to said valve body for sealing off said ball entry and removal passage;
- a retainer carried by said rotatable valve member within said diametrical bore thereof and at one end thereof for capturing a paraffin cutting ball when the rotatable valve member is positioned such that the end of said diametrical bore of said rotatable valve member remote from said retainer is proximate to and in axial alignment with the inlet port, and said retainer bearing an aperture to permit flow of liquid therethrough, absent the presence of said paraffin cutting ball;
- a bypass fluid passage within said valve body, opening at one end to said axial flow passage defined by said diametrical bore of said valve body, upstream of said inlet port, and opening at an opposite end to said axial flow passage downstream of said outlet port; and
- means carried by said valve body for mechanically driving said paraffin cutting ball from said rotatable valve member diametrical bore through said ball entry and removal passage when said rotatable valve member is in valve closed position and said rotatable valve member diametrical bore is aligned with said paraffin cutting ball entry and removal passage and open thereto, and wherein said valve body is of cross shape in plan configuration, including two axially aligned tubular cylindrical members projecting respectively away from each other at said inlet and outlet ports and aligned therewith, for receiving a liquid oil flow and for discharging the same after passage through the apparatus, respectively, and diametrically opposite cylindrical projections at right angles to said aligned tubular cylindrical members of the valve body, consisting of a cylindrical valve body end plug and a cylindrical hollow tubular valve body member, said cylindrical valve body end plug having a central aperture slidably mounting an axially shiftable knockout rod, having an axis thereof coincident with the axis of the diametrical bore within said rotatable valve member when rotated to the valve closed position, and wherein the knockout rod is of a diameter sized to pass through the central aperture within said retainer and permitting the knockout rod to mechanically discharge a captured paraffin cutting ball from said apparatus through an open end of said cylindrical hollow tubular valve body member after removal of said doll cap.

* * * * *